[54] 2,4-DIHYDRO-2-SUBSTITUTED-1H-S-TRIAZOLA[4,3-A][1,4]-BENZODIAZEPINES

[75] Inventors: Jackson B. Hester, Jr., Galesburg; Jacob Szmuszkovicz, Kalamazoo, both of Mich.

[73] Assignee: The Upjohn Company, Kalamazoo, Mich.

[22] Filed: Dec. 17, 1973

[21] Appl. No.: 425,265

Related U.S. Application Data

[63] Continuation-in-part of Ser. No. 178,791, Sept. 8, 1971, abandoned.

[52] U.S. Cl. .......... 260/308 R, 71/92, 260/239 BD, 260/239.3 D, 424/244, 424/269
[51] Int. Cl. ..................... C07d 53/06, C07d 57/02
[58] Field of Search ................................ 260/304 R

[56] References Cited
UNITED STATES PATENTS
3,701,782   10/1972   Hester............................. 260/308 R OTHER PUBLICATIONS
Hester et al., Chem. Abstracts, Vol. 78, Abstract No. 14814p (1973).

*Primary Examiner*—Alton D. Rollins
*Attorney, Agent, or Firm*—Hans L. Berneis

[57] ABSTRACT

2,4-Dihydro-2-substituted-1H-s-triazolo[4,3-a][1,4]-benzodiazepines selected from the formulae IV

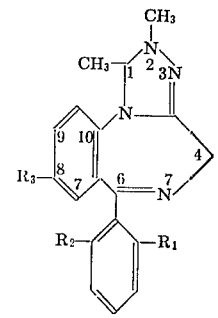

wherein $R_1$ is hydrogen, chlorine, or fluorine; wherein $R_2$ is hydrogen or fluorine, providing $R_1$ is fluorine, and wherein $R_3$ is chlorine or fluorine, are prepared by a multistep-reaction.

The new compounds of formula IV per se, or as acid addition salts, are useful sedatives for the use in mammals.

3 Claims, No Drawings

2,4-DIHYDRO-2-SUBSTITUTED-1H-S-TRIAZOLA[4,3-A][1,4]-BENZODIAZEPINES

CROSS REFERENCES TO RELATED APPLICATION

This application is a continuation in part of application Ser. No. 178,791, filed Sept. 8, 1971, and now abandoned.

BACKGROUND OF THE INVENTION

Field of the Invention

This invention is directed to new organic compounds and is particularly concerned with novel 1H-s-triazolo-[4,3-a][1,4]benzodiazepines IV and a process for the production thereof and intermediates therefor.

The novel compounds and the process of production therefor can be illustratively represented as follows:

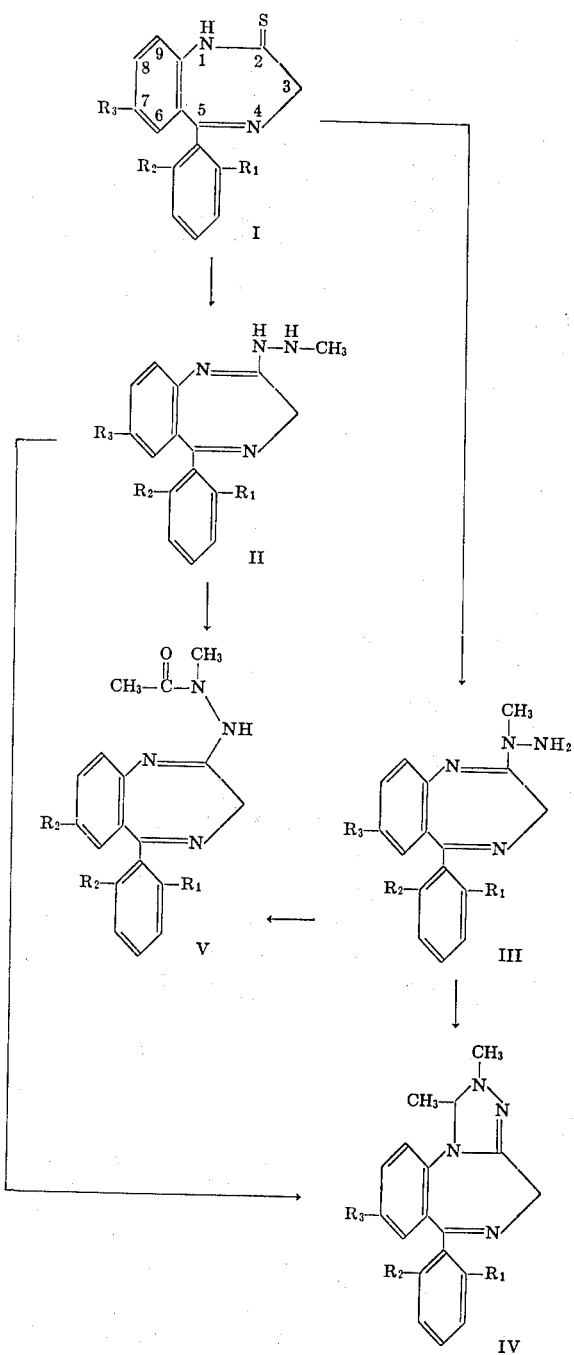

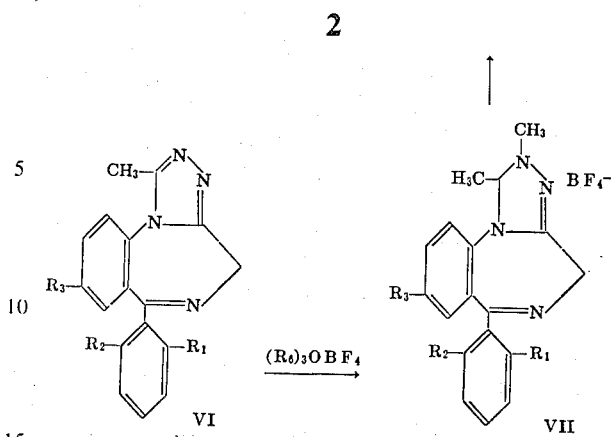

wherein $R_1$ is hydrogen, chlorine or fluorine; wherein $R_2$ is hydrogen, or fluorine with the provision that $R_7$ is fluorine; and wherein $R_3$ is chlorine or fluorine.

The process of this invention comprises: treating a 1,3-dihydro-5-phenyl-2H-1,4-benzodiazepine-2-thione (I) ) with methyl hydrazine in an lower alkanol for several hours to obtain the corresponding 5-phenyl-2-(1- and 2-substituted hydrazino)-3H-1,4-benzodiazepines (II) and (III); heating the mixture of II and III with acetaldehyde, to obtain the corresponding 2,4-dihydro-2-substituted-6-phenyl-1H-s-triazolo[4,3-a] [1,4]benzodiazepines of formula IV and the benzodiazepines of structure V. Compound IV can also be produced by reacting 6-phenyl-4H-s-triazolo[4,3-a]-[1,4]benzodiazepines with a methyloxonium fluoroborate of the formula:

$(CH_3)_3O^+BF_4^-$ at room temperature and reducing the product (VII) with sodium borohydride to obtain compound IV as defined above.

DESCRIPTION OF THE PREFERRED EMBODIMENT

The novel compounds of the formula IV and V including acid addition salts thereof have sedative, tranquilizing, muscle relaxant, hypnotic, and anticonvulsant effects in mammals and birds.

These compounds are furthermore useful as feed additives for increasing the growth rate and feed efficiency of livestock and poultry.

The acid addition salts of compounds of formula IV and V contemplated in this invention, are the hydrochlorides, hydrobromides, hydriodides, sulfates, phosphates, cyclohexanesulfamates, methanesulfonates, toluenesulfonates, lactates, tartrates, citrates, acetates, and the like, prepared by reacting a compound of formulae IV or V with the stoichiometrically calculated amount of the selected pharmacologically acceptable acid.

Sedative effects of 8-chloro-2,4-dihydro-1,2-dimethyl-6-phenyl-1H-s-triazolo[4,3-a][1,4]benzodiazepine (IV) are shown by the following tests in mice:

Chimney test:

[Med. Exp. 4, 145 (1961)]: The effective intraperitoneal dosage for 50% of mice ($ED_{50}$) is 1.2 mg./kg. The test determines the ability of mice to back up and out of a vertical glass cylinder within 30 seconds. At the effective dosage, 50% of the mice failed doing it.

Dish test:

Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal adminstration) in this test was 2.3 mg./kg.;

Pedestal test:

The untreated mouse leaves the pedestal in less than a minute to climb back to the floor of the standard mouse box. Tranquilized mice will stay on the pedestal for more than 1 minute. The $ED_{50}$ (intraperitoneal administration) is 20.0 mg./kg.

Nicotine antagonism test:

Mice in a group of 6 are injected with the test compound (8-chloro-2,4-dihydro-1,2-dimethyl-6-phenyl-1H-s-triazolo[4,3-a][1,4]benzodiazepine). Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of 0.71 mg./kg. of the test compound protected 50% of the mice against (2) and (3) ($ED_{50}$).

Antagonism to strychnine (as sulfate):

The effective dosage $ED_{50}$ of 8-chloro-2,4-dihydro-1,2-dimethyl-6-phenyl-1H-s-triazolo[4,3-a][1,4]benzodiazepine (IV is 8 mg./kg. orally in mice. The test consists in orally administering to groups of 6 mice the test compound, 8-chloro-2,4-dihydro-1,2-dimethyl-6-phenyl-1H-s-triazolo[4,3-a][1,4]benzodiazepine (IV), and 30 minutes later 3 mg./kg. of strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The compound, 2-(2-acetyl-2-methylhydrazino)-7-chloro-5-phenyl-3H-1,4-benzodiazepine (V) has the following $ED_{50}$

| | |
|---|---|
| Chimney | 36 mg./kg. |
| Dish Test | 20 mg./kg. |
| Pedestal | 32 mg./kg. |
| Nicotine (2) | 14 mg./kg. |
| Nicotine (3) | 14 mg./kg. |

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring, and flavoring agents may be added.

For mammals and birds food premixes, with starch, oatmeal, dried fishmeat, fishmeal, flour and the like can be prepared.

In feed for chicken, swine or cattle from 25–25,000 mg. of compounds of formulae IV or V, or acid addition salts thereof are incorporated per ton of feed.

As tranquilizer, the compounds of formulae IV and V can be used in dosages of 0.1 mg.–20 mg./kg. in oral or injectable preparations as described above, to alleviate tension and anxiety in mammals, or birds, such as e.g., occurs when animals are in travel.

Other acid addition salts of the compounds of formula IV and V can be made such as the fluosilicic acid addition salts which are useful mothproofing compounds or the trichloroacetates useful as herbicides against Johnson grass, Bermuda grass, yellow foxtail, and green foxtail, and quack grass.

The starting materials of formula I of this invention, substituted or unsubstituted 1,3-dihydro-5-phenyl-2H-1,4-benzodiazepine-2-thiones, are described by G. A. Archer and L. H. Sternbach [J. Org. Chem. 20, 231 (1964) and U.S. Pat. No. 3,422,091]. These compounds (I) are made by the reaction of the known substituted or unsubstituted 1,3-dihydro-5-phenyl2H-1,4-benzodiazepin-2-ones by heating with phosphorus pentasulfide in pyridine for about 45 minutes (Archer et al., ibid.). The following compounds of formula I are representative starting materials:

7-chloro-1,3-dihydro-5-(o-chlorophenyl)-2H-1,4-benzodiazepine-2-thione;

7-chloro-1,3-dihydro-5-phenyl-2H-1,4-benzodiazepine-2-thione;

7-fluoro-1,3-dihydro-5-phenyl-2H-1,4-benzodiazepine-2-thione;

7-fluoro-1,3-dihydro-5-(2,6-difluorophenyl)-2H-1,4-benzodiazepine-2-thione;

7-chloro-1,3-dihydro-5-(o-fluorophenyl)-2H-1,4-benzodiazepine-2-thione;

7-fluoro-1,3-dihydro-5-(o-chlorophenyl)-2H-1,4-benzodiazepine-2-thione;

7-chloro-1,3-dihydro-5-(2,6-difluorophenyl)-2H-1,4-benzodiazepine-2-thione; and the like.

In carrying out the process of the invention, a selected 1,3-dihydro-5-phenyl-2H-1,4-benzodiazepine-2-thione (I) in an inert organic solvent, preferably in a lower-alkanol, e.g., methanol, ethanol, 1-propanol, 2-propanol, 1-butanol, 2-butanol, and the like, is stirred with excess [3-10 moles of hydrazine per mole of thione (II)] of methyl hydrazine.

In the preferred embodiment of this invention the reaction is carried out at room temperature 20°–30°C., but temperatures between 10° and 50° C. are operative. The time of the reaction is one to 12 hours, with 2 to 5 hours preferred. At the termination of the reaction the product, a 2-(1-substituted hydrazino)-5-phenyl-3H-1,4-benzodiazepine (II) and a 2-(2-substituted hydrazino)-5-phenyl-3H-1,4-benzodiazepine (III) are isolated and purified by conventional procedures, e.g., extraction, chromatography, crystallization and the like; however, the crude product mixture, obtained by evaporating the reaction mixture can be used for the next step.

The mixture of II and III is stirred with excess aldehyde forming a suspension. If the aldehyde is not liquid, an organic solvent e.g., ether, tetrahydrofuran or the like can be employed. The time for stirring is 1 to 12 hours. The reaction is carried out preferably at room temperatures 20°–28° C., but is operative at between 10°–50° C. After evaporation, the products, a 2,4-dihydro-2-substituted-6-phenyl-1H-s-triazolo[4,3-a][1,4]benzodiazepine IV, the open chain compound a 2-(2,2-disubstituted hydrazino)-5-phenyl-3H-1,4-benzodiazepine (V), and often a 3rd compound of unknown structure are isolated, purified, and separated by conventional methods, e.g., evaporation, extraction, crystallization, chromatography, and the like.

The following examples are illustrative of the processes and products of the present invention, but are not to be construed as limiting.

Example 1

8-Chloro-2,4-dihydro-1,2-dimethyl-6-phenyl-1H-s-triazolo[4,3-a][1,4]benzodiazepine and 7-chloro-2-(2-acetyl-2-methylhydrazino)-5-phenyl-3H-1,4-benzodiazepine A mixture of 7-chloro-1,3-dihydro-5-phenyl-2H-1,4-benzodiazepin-2-thione (5.74 g.; 0.02 mole), methyl hydrazine (4.02 g.; 0.0875 mole) and 200 ml. of methanol was stirred for 2.3 hours and was then evaporated in vacuo at room-temperature. A solution of the residue in 75 ml. of methylene chloride was washed with cold water (4 × 50 ml.), once with saturated salt solution, dried over anhydrous magnesium sulfate and evaporated at room temperature. The residue was stirred for 2.5 hours with 25 ml. of acetaldehyde, the resulting suspension was evaporated and the residue extracted with ether (4 × 50 ml.) (extract A). The insoluble solid (2.1 g.) was crystallized from ethyl acetate to give 1.5 g. of 8-chloro-2,4-dihydro-1,2-dimethyl-6-phenyl-1H-s-triazolo[4,3-a][1,4]-benzodiazepine as yellow plates of melting point 191°–199°C. (dec.) unchanged on recrystallization.

Anal. calcd. for $C_{18}H_{17}ClN_4$:

C, 66.56; H, 5.28; Cl, 10.91; N, 17.25

Found:

C, 66.72; H, 5.18; Cl, 10.89; N, 17.19.

Ether extract A was concentrated to one half volume, allowed to crystallize and the solid (A) was collected (1 g.). This operation was repeated to give solid B (0.9 g.) and a third time to give 0.45 g., of solid C of melting point 189°–195° C. Solid C was recrystallized from ethyl acetate to give colorless rods of compound III of unknown structure and of melting point 199°–200° C. unchanged on recrystallization.

Anal. calcd. for $C_{18}H_{17}ClN_4$:

C, 66.56; H, 5.28; Cl, 10.91; N, 17.25.

Found:

C, 66.69; H, 5.05; Cl, 10.77; N, 17.41.

All the filtrates and solids A and B were combined and chromatographed on silica gel (580 g.) using 3% methanol-96% chloroform-1% triethylamine. Fractions 1–7 (250 ml. each) gave no material. Fractions 8–11 (600 ml. total) had one spot by thin layer chromatography; and on crystallization from ethyl acetate gave additional 0.573 g. of compound III of melting point 199°–200° C. Fraction 12 (100 ml., 0.348 g.) was discarded. Fraction 13 (100 ml., 1.6 g.) had five spots by thin layer chromatography including compounds I and III. Fractions 14–16 (100 ml. each, 1.257 g.) contained by thin layer chromatography only compounds I and II. Fractions 17–18 (100 ml. each) were crystallized from ether, followed by two crystallizations from ethyl acetate to give 0.185 g. of colorless prisms of compound II of melting point 209°(dec.).

Anal. calcd. for $C_{18}H_{17}ClN_4 \cdot 0.1/4EtOAc$:

C, 62.89; H, 5.28; Cl, 9.77; N, 15.44.

Found:

C, 62.85; H, 5.28; Cl, 10.10; N, 15.87.

Example 2

8-Chloro-2,4-dihydro-1,2-dimethyl-6-(o-chlorophenyl)-1H-s-triazolo[4,3-a][1,4]benzodiazepine and 7-chloro-2-(2-acetyl-2-methylhydrazino)-5-(o-chlorophenyl)-5-(o-chlorophenyl)-3H-1,4-benzodiazepine.

In the manner given in Example 1, 7-chloro-1,3-dihydro-5-(o-chlorophenyl)-2H-1,4-benzodiazepine-2-thione was reacted with methylhydrazine and the rsulting product with acetaldehyde to give 8-chloro-2,4-dihydro-1,2-dimethyl-6-(o-chlorophenyl)-1H-s-triazolo[4,3-a][1,4]benzodiazepine and 7-chloro-2-(2-acetyl-2-methylhydrazino)-5-(o-chlorophenyl)-3H-1,4-benzodiazepine.

Example 3

8-fluoro-2,4-dihydro-1,2-dimethyl-6-(o-chlorophenyl)-1H-s-triazolo[4,3-a][1,4]benzodiazepine and 7-flouro-2-(2-acetyl-2-methylhydrazino)-5-(o-chlorophenyl)-3H-1,4-benzodiazepine.

In the manner given in Example 1, 7-fluoro-1,3-dihydro-5-(o-chlorophenyl)-2H-1,4-benzodiazepine-2-thione was reacted with methylhydrazine and the resulting product with acetaldehyde to give 8-fluoro-2,4-dihydro-1,2-dimethyl-6-(o-chlorophenyl)-1H-s-triazolo[4,3-a][1,4]benzodiazepine and 7-fluoro-2-(2-acetyl-2-methylhydrazino)-5-(o-chlorophenyl)-3H-1,4-benzodiazepine.

Example 4

8-chloro-2-,4-dihydro-1,2-dimethyl-6-(2,6-difluorophenyl)-1H-s-triazolo[4,3-a][1,4]benzodiazepine and 7-chloro-2-[2-acetyl-2-methylhydrazino]-5-(2,6-difluorophenyl)-3H-1,4-benzodiazepine In the manner given in Example 1, 7-chloro-2,3-dihydro-5-(2,6-difluorophenyl)-2H-1,4-benzodiazepine-2-thione was reacted with methylhydrazine and the resulting product with acetaldehyde to give 8-chloro-2,4-dihydro-1,2-dimethyl-6-(2,6-difluorophenyl)-1H-s-triazolo[4,3-a][1,4]benzodiazepine and -chloro-2-[2-acetyl-2-methylhydrazino]-5-(2,6-difluorophenyl)-3H-1,4-benzodiazepine.

Example 5

8-fluror-2,4-dihydro-1,2-dimethyl-6-(o-fluorophenyl)-1H-s-triazolo[4,3-a][1,4]-benzodiazepine and 7-fluoro-2-[2-acetyl-2-methylhydrazino]-5-(o-fluorophenyl)-3H-1,4-benzodiazepine.

In the manner given in Example 1, 7-fluoro-1,3-dihydro-5-(o-fluorophenyl)-2H-1,4-benzodiazepine-2-thione was reacted with methylhydrazine and the resulting product with acetaldehyde to give 8-fluoro-2,4-dihydro-1,2-dimethyl-6-(o-fluorophenyl)-1H-s-triazolo[4,3-a][1,4]benzodiazepine and 7-fluoro-2-[2-acetyl-2-methylhydrazino]-5-(o-fluorophenyl)-3H-1,4-benzodiazepine.

Example 6

8-Chloro-1,2-dimethyl-6-phenyl-4H-s-triazolo-[4,3-a][1,4]benzodiazepinium fluoroborate and 8-chloro-1,2-dimethyl-6-phenyl-4H-s-triazolo[4,3-a][1,4]benzodiazepinium bromide.

A solution of 8-chloro-1-methyl-6-phenyl-4H-s-triazolo[4,3-a][1,4]benzodiazepine [Belgian Pat. No. 747,493](6.19 g., 0.02 mole) in dry methylene chloride (120 ml.), under nitrogen was treated with trimethyloxonium fluoroborate [$(CH_3)_3OBF_4$] and stirred at ambient temperature for 18 hours. The resulting mixture was concentrated in vacuo, and the residue was suspended in dry ether and stirred for about 30 minutes. The amorphous solid was collected by filtration and dried to give 8.39 g. of 8-chloro-1,2-dimethyl-6-phenyl-4H-s-triazolo[4,3-a][1,4]-benzodiazepinium fluoroborate.

The crude fluoroborate (4.11 g.) was added to a solution of potassium bromide (1.31 g.) in water (2.6 ml.). The resulting mixture was treated with absolute ethanol (12 ml.), stirred for 1 hour 45 minutes, and filtered. The filtrate was concentrated and the residue was crystallized from ethanol-ethylacetate to give 0.655 g. of 8-chloro-1,2-dimethyl-6-phenyl-4H-s-triazolo[4,3-a]-[1,4]benzodiazepinium bromide of melting point 233.5°–235°C. The analytical sample had a melting point of 235°–236°C.

Anal. calcd. for $C_{18}H_{16}BrClN_4$:
C, 53.54; H, 3.99; Br, 19.79; Cl, 8.78; N, 13.89.
Found:
C, 52.99; H, 3.74; Br, 19.83; Cl, 8.47; N, 13.86.

Example 7

8-Chloro-2,4-dihydro-1,2-dimethyl-6-phenyl-1H-s-triazolo[4,3-a][1,4]benzodiazepine A stirred suspension of 8-chloro-1,2-dimethyl-6-phenyl-4H-s-triazolo[4,3-a][1,4]benzodiazepinium fluoroborate (6.15 g.) in ice cold absolute ethanol (60 ml.), under nitrogen, was treated during about 1 minute with sodium borohydride (0.567 g.). The mixture was stirred for 15 minutes and poured into ice water. This mixture was extracted with chloroform. The extract was washed with cold, dilute brine, dried over anhydrous potassium carbonate and concentrated in vacuo. The residue was dissolved in methylene chloride and crystallized at about 25°, by replacing the methylene chloride with ethyl acetate under a stream of nitrogen, to give 1.58 g. of 8-chloro-2,4-dihydro-1,2-dimethyl-6-phenyl-4H-s-triazolo-[4,3-a][1,4]benzodiazepine of melting point 177°–180°C. dec. This material was recrystallized from methylene chloride-ethyl acetate to give 1.24 g. of product of melting point 184°–186° C. dec.

Example 8

8-Chloro-1,2-dimethyl-6-(2,6-difluorophenyl)-4H-s-triazolo[4,3-a][1,4]benzodiazepinium fluoroborate In the manner given in Example 6, 8-chloro-1-methyl-6-(2,6-difluorophenyl)-4H-s-triazolo[4,3-a][1,4]benzodiazepine was reacted with trimethyloxonium fluoroborate borate in methylene chloride to give 8-chloro-1,2-dimethyl-6-(2,6-difluorophenyl)-4H-s-triazolo[4,3-a][1,4]benzodiazepinium fluoroborate.

Example 9

2,4-dihydro-8-chloro-1,2-dimethyl-6-(2,6-difluorophenyl-4H-s-triazolo[4,3-a][1,4]benzodiazepine.

In the manner given in Example 7, 8-chloro-1,2-dimethyl-6-(2,6-difluorophenyl)-4H-s-triazolo[4,3-a][1,4]benzodiazepinium fluoroborate was reduced with sodium hydride in ethanol to give 2,4-dihydro-8-chloro-1,2-dimethyl-6-(2,6-difluorophenyl-4H-s-triazolo[4,3-a][1,4]benzodiazepine.

Example 10

8-fluoro-1,2-dimethyl-6-(o-fluorophenyl)-4H-s-triazolo[4,3-a][1,4]benzodiazepinium fluoroborate.

In the manner given in Example 6,8-fluoro-1-methyl-6-(o-fluorophenyl)-4H-s-triazolo[4,3-a][1,4]benzodiazepine was reacted with trimethyloxonium fluoroborate in methylene chloride to give 8-fluoro-1,2-dimethyl-6-(o-fluorophenyl)-4H-s-triazolo[4,3-a][1,4]benzodiazepinium fluoroborate.

Example 11

2,4-Dihydro-8-fluoro-1,2-dimethyl-6-(o-fluorophenyl)-1H-s-triazolo[4,3-a][1,4]-benzoidiazepine.

In the manner given in Example 7, 8-fluoro-1,2-dimethyl-6-(o-fluorophenyl)-4H-s-triazolo-[4,3-a][1,4]benzodiazepinium fluoroborate was reduced with sodium borohydride in ethanol to give 2,4-dihydro-8-fluoro-1,3-dimethyl-6-(o-flurophenyl)-1H-s-triazolo[4,3--][1,4]benzodiazepine.

In the manner given in the prior Examples, other compounds corresponding to formula IV and V can be prepared. Representative compounds, thus produced, include:

8-chloro-2,4-dihydro-1,2-dimethyl-6-(o-fluoro-phenyl)-1H-s-triazolo[ 4,3-a][1,4)benzodiazepine; and the like.

Treating the compounds of formulae IV or V with pharmacologically acceptable acids such as hydrochloric, hydrobromic, phosphoric, sulfuric, acetic, propionic, toluenesulfonic, methanesulfonic, tartaric, citric, lactic, malic, maleic, cyclohexanesulfamic acids, and the like, produces the pharmacologically acceptable salts of these compounds of formulae IV or V which can be used like the free base compounds of formulae IV and V. Salt formation is achieved in conventional manner by reacting the compounds of formulae IV or V with excess of a selected acid in a suitable medium e.g. water, a lower alkanol, ether, or acetone and recovering the salt by evaporating the solvent, preferably in vacuo.

We claim:

1. A benzodiazepine selected from the group consisting of a compound of the formula IV:

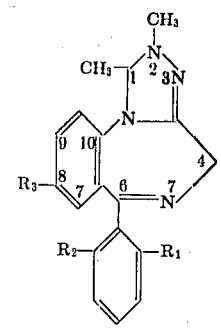

IV wherein $R_1$ is hydrogen, chloro or fluoro; wherein $R_2$ is hydrogen, or fluoro providing $R_1$ is fluoro; wherein $R_3$ is chloro or fluoro, and the pharmacologically acceptable acid addition salts of compounds of formulae IV.

2. A compound according to wherein $R_1$ and $R_2$ are hydrogen, $R_3$ is 8-chloro and the compound is therefore 8-chloro-2,4-dihydro-1,2-dimethyl-6-phenyl-1H-s-triazolo[4,3-a][1,4benzodiazepine.

3. A compound according to claim 1 wherein $R_1$ and $R_3$ are chloro, $R_2$ is hydrogen, and the compound is therefore 8-chloro-2,4-dihydro-1,2-dimethyl-6-(o-chlorophenyl)-1H-s-triazolo[4,3-a][1,4]benzodiazepine.

* * * * *